United States Patent

[11] 3,627,638

[72] Inventors Sidney Alan Barker;
Peter John Somers, both of Birmingham;
Roger Epton, Wolverhampton, all of England
[21] Appl. No. 867,098
[22] Filed Oct. 16, 1969
[45] Patented Dec. 14, 1971
[73] Assignee Ranks Horis McDougall Limited
London, England
[32] Priority Oct. 23, 1968
[33] Great Britain
[31] 50,351/68

[54] AMYLASE CHEMICALLY COUPLED TO CELLULOSE ETHERS
18 Claims, No Drawings
[52] U.S. Cl. .................................................. 195/63, 195/DIG. 11, 195/68
[51] Int. Cl. .................................................. C07g 7/02
[50] Field of Search .................................................. 195/63, 63 P, 68, 31; 252/89, 89 D

[56] References Cited
OTHER REFERENCES

Manecke; Von G., Die Naturwissenschaften Vol. 51 p. 25–33, 1964.

Axen et al., Nature Vol. 210, p. 367–369, 1966.

Silman et al., Annual Review of Biochemistry Vol. 35, part II, p. 873–883, 1966.

*Primary Examiner*—Lionel M. Shapiro
*Assistant Examiner*—Gary M. Nath
*Attorney*—Stevens, Davis, Miller & Mosher ABSTRACT: A water insoluble amylase comprising α- β- or γ-amylase chemically coupled to p-diazophenoxy hydroxypropyl cellulose or α- or β- amylase chemically coupled to p-isothiocyanatophenoxy hydroxypropyl cellulose. These are prepared by dissolving α-, β- or γ-amylase in a buffer within a pH range of 6.3–7.7 and reacting at 0°–5° C. with the p-diazophenoxy hydroxypropyl ether of cellulose or by dissolving α- or β-amylase in a buffer at a pH of approximately 8.6 with a p-isothiocyanato phenoxy hydroxypropyl ether of cellulose.

AMYLASE CHEMICALLY COUPLED TO CELLULOSE ETHERS

This invention is for improvements in or relating to enzymes and has particular reference to the modification of enzymes by attachment to solid matrices.

More particularly this invention relates to the water insolubilization of enzymes by chemically attaching them to cellulose derivatives and has as an object the provision of enzyme preparations in a form where they can be reused repeatedly and be more stable to heat than the corresponding soluble enzyme.

Water insoluble derivatives of $\alpha$-amylase (diastase) have been prepared by chemical coupling of the enzyme to (a) nitrated copolymers of methacrylic acid, methacrylic acid m-fluoranilide and divinyl benzene (G. Manecke and G. Gunzel, Makromolekulare Chem., 51, (1962), 199 & G. Manecke, Pure Appl. Chem., 4 (1962), 507), and (b) nitrated copolymers of methacrylic acid, 4- or 3-fluorostyrene and divinyl benzene (G. Manecke and H. J. Forster Makromolekulare Chem., 91 (1966), 136). The enzyme activity of the bound protein in these preparations did not exceed 3 percent of that of the free enzyme in aqueous solution. Also the stability of these preparations was reported to be of only the same order as aqueous solutions of $\alpha$-amylase stored under similar conditions.

It is well-known that when an enzyme is attached to an insoluble support the novel microenvironment of the enzyme markedly affects its stability. Hydrophilic features of the carrier tend to enhance the stability of the attached enzyme whereas hydrophobic features have the opposite effect. Polysaccharide carriers such as fibrous cellulose (M. A. Mitz and L. J. Summaria, Nature, London 189, (1961), 576 & W. E. Hornby, M. D., Lilly and E. M. Crook, Biochem, J., 98, (1966), 420) and cross-linked dextran (R. Axen and J. Porath, Nature, London 210, (1966), 367) have been shown to be particularly effective in conferring stability to the attached enzyme.

Commercial samples of water insoluble forms of trypsin, chymotrypsin, ribonuclease, glucose oxidase and ficin became available in Feb. 1968. These were obtained by reaction of the appropriate enzyme with carboxymethyl cellulose hydrazide and are marketed by Seravac Laboratories, Ltd., Maidenhead, Berks.

Almost simultaneously (Jan. 1968) Miles Laboratories, Inc., Elkhart, U.S.A., marketed water insoluble forms of trypsin, chymotrypsin and papain in which the enzymes were bound to ethylene-maleic anhydride copolymer carrier.

R. Axen and J. Porath, Nature 210 (1966), 367, succeeded in preparing active water insoluble chymotrypsin and trypsin by reaction of the enzymes with p-isothiocyanato phenoxy hydroxypropyl — "Sephadex" (cross-linked dextran). They were unsuccessful in their attempt to obtain an active water insoluble $\beta$-amylase by the same process.

It is an object of the present invention to provide active water insoluble preparations of $\alpha$-amylase, $\beta$-amylase and $\gamma$-amylase wherein the enzyme is chemically coupled with the p-diazophenoxy hydroxypropyl and p-isothiocyanato phenoxy hydroxy propyl ethers derived from microcrystalline cellulose.

The present invention provides a water insoluble amylase chemically coupled to p-diazophenoxy hydroxy propyl- or p-isothiocyanato phenoxy hydroxypropyl cellulose.

More specifically the invention provides $\alpha$, $\beta$- and $\gamma$-amylase chemically coupled to p-diazophenoxy hydroxy propyl cellulose and $\alpha$- and $\beta$-amylase chemically coupled to p-isothiocyanato phenoxy hydroxypropyl cellulose.

Water insoluble preparations of $\alpha$-, $\beta$- or $\gamma$-amylase may be made by chemical reaction at 0°–5° C. of the amylase dissolved in a buffer within a pH range of 6.3–7.7 (preferably 7.6–7.7) with the p-diazophenoxyhydroxy propyl ether of cellulose. Unreacted diazo groups in the cellulose derivative are annealed by reaction with either $\beta$-naphthol or phenol. Preferably microcrystalline cellulose is used for the preparation of this ether and the degree of substitution of ether groups in the cellulose can be 13–56.2 microequivalents (preferably 13 microequivalents) of p-diazophenoxyhydroxypropyl ether groups per gram of cellulose. Active water insoluble preparations of $\alpha$-amylase, $\beta$-amylase, glucamylase ($\gamma$-amylase) can be obtained by this process which are more heat stable when suspended in an aqueous buffer (0.02 M) than the corresponding soluble enzyme. Preferably the buffer should have that pH at which the enzyme displays maximum enzymic activity towards its substrate.

Alternatively, water insoluble preparations of $\alpha$- or $\beta$-amylase may be made by chemical reaction at 0°–5° C. of $\alpha$- or $\beta$-amylase dissolved in a buffer (preferably 0.05 M borate buffer, pH 8.6) with the p-isothiocyanato-phenoxy-hydroxypropyl ether of cellulose. Preferably microcrystalline cellulose is used for the preparation of this ether and the degree of substitution of ether groups in the cellulose can be 13–56.2 microequivalents (preferably 13 microequivalents) of p-isothiocyanato-phenoxy-hydroxypropyl ether groups per gram of cellulose. Active water insoluble preparations of $\alpha$-amylase and $\beta$-amylase but not glucamylase ($\gamma$-amylase) can be obtained by this method which are more heat stable when suspended in an aqueous buffer (0.02 M) than the corresponding soluble enzyme. Preferably the buffer should have that pH at which the enzyme displays maximum enzymic activity towards its substrate.

The particular merits of the present invention for providing water insoluble enzymes is that it can provide a product with a high retention of activity when calculated as a percentage of the activity which that amount of enzyme protein bound to the cellulose derivative would display in its original soluble form. The second advantage is that the process of the invention may be particularly advantageous for exoenzymes such as $\beta$- and $\gamma$-amylase (compare the water insoluble preparations of $\beta$-amylase obtained by reaction with the p-isothio-cyanato phenoxy hydroxypropyl ether of cross-linked dextran-Sephadex which were enzymically inactive, Axen and Porath, Nature, London 210 (1966) 367). The third advantage is that the use of microcrystalline cellulose in the preparation of the ether affords a dense hydrophilic carrier available in a fine particulate form for maximum surface exposure yet easily recoverable after use by centrifugation or filtration. The fourth advantage is the much greater heat stability of the water insoluble enzymes which may be obtained by the process of the present invention compared with the corresponding soluble enzyme giving a greater shelf life, a greater retention of activity at operating temperatures and enabling maximum repetitive use to be made of the enzyme.

Following is a description by way of example of methods of carrying the invention into effect.

EXAMPLE 1 p-Nitrophenol (69.5 g., 0.5 mole) was suspended in a solution of sodium hydroxide (25 g., 0.6 mole) in water (400 ml.) and the mixture heated to 70° C. to effect solution. On cooling slowly to room temperature with vigorous stirring finely divided sodium p-nitrophenoxide separated. Epichlorohydrin (46 g., 0.5 mole) was added and the solution gently stirred for 6 days at room temperature after which the solid was collected and washed on a filter with distilled water until free of bright yellow sodium p-nitro-phenoxide. The off-white damp solid was dissolved directly in ether (500 ml.) and the water layer which separated discarded. The ether layer was dried with magnesium sulfate and concentrated when a very pale yellow solid crystallized. Recrystallization from light petroleum (40/60) gave pure p-nitrophenylglycidyl ether 25.0 g. (25.5%), m.p. 67° C., (E. Marle, J. Chem. Soc., (1912) 305).

Samples of microcrystalline cellulose (10 g., Sigmacel type 38 purchased from the Sigma Chemical Company, England) were placed in four 50-ml. stoppered round-bottomed flasks which were subsequently evacuated, left for 1 hour and filled with nitrogen. After warming each flask to 50° C. prewarmed aliquots (20 ml.) of a 10 percent solution of p-nitrophenylglycidyl ether were added followed by aliquots (10 ml.) of 10 percent aqueous sodium hydroxide solution. The contents of the flasks were then well mixed and stoppered. All operations were performed under nitrogen. The flasks were then maintained at 50° C. After times of 12, 24, 48 and 96 hours the reaction mixture was transferred to a mortar and ground lightly with 2N acetic acid before being suspended and stirred for 0.5 hours with the same solvent (0.5L.). The p-nitrophenoxy-hydroxy-propyl cellulose ethers were then collected, washed and ground lightly with acetone and then stirred with acetone (0.5L.) for 0.5 hours. After three washings with distilled water (1 L.) and one further washing with acetone (0.5 L.) the pale yellow ethers were collected on a filter and dried.

magnetically stirred for 15 minutes. The washing cycle was repeated three times. After the final washings had been decanted, aliquots (1 ml.) of a 0.5 percent α-amylase solution (crystalline, ex *Bacillus subtilis* purchased from Sigma Chemical Company) in phosphate buffer (0.075 M, ph 7.6–7.7) were added and the tubes stirred magnetically at 0°–5° C. for 18 hours when aliquots (5 ml.) of an ice-cold solution of β-naphthol (0.1 percent) in saturated sodium acetate was added. After a further 15 minutes the water-insoluble α-amylase derivatives were subjected to five cycles of washing with phosphate buffer (0.02 M, pH 6.9, 15 ml.) and sodium chloride (0.5 M) solution (15 ml.) in the same buffer. The α-amylase derivatives were finally washed twice with phosphate buffer (0.02 M, pH 6.9).

RESULTS

| Functional group active in protein binding | μ eq. active functional group/g. cellulose | Mg. bound protein/ 100 mg. derivative | Enzyme units [1]/mg. bound protein | Percent activity retained by enzyme after coupling | Prep. No. |
|---|---|---|---|---|---|
| p-Diazophenoxyhydroxy-propyl, pH 7.6–7.7 | 13.0 | 1.04 | 54.0 | 60 | 1 |
| | 20.7 | 1.09 | 40.8 | 53 | 2 |
| | 31.3 | 1.46 | 33.7 | 38 | 3 |
| | 56.2 | 1.66 | 33.3 | 37 | 4 |

[1] One α-amylase unit is that which liberates reducing sugar equivalent to 1 mg. maltose in 3 minutes at 20° C.

Reduction of the p-nitrophenoxy-hydroxypropyl cellulose ether was effected by suspending samples (2 g.) in a 5 percent solution of titanous chloride in 6N hydrochloric acid (200 ml.) at 100° C. for 5 minutes. The p-amino-phenoxy-hydroxypropyl cellulose ether hydrochlorides were collected on a filter and washed with 2N hydrochloric acid until free of excess titanous chloride. After grinding lightly in a mortar with distilled water the samples were washed three times with distilled water (0.5 L.) and finally with acetone (500 ml.) before being collected on a filter and dried.

The degree of etherification was determined by titration of the p-amino-phenoxy-hydroxypropyl cellulose hydrochlorides with aqueous sodium hydroxide solution.

Degree of Substitution of p-Aminophenoxy-Hydroxypropyl Cellulose

| Reaction time of p-nitro-phenylglycidyl ether with cellulose (h) | μeq p-amino-phenoxy-hydroxypropyl ether per g. of cellulose |
|---|---|
| 12 | 13.0 |
| 24 | 20.7 |
| 48 | 31.3 |
| 96 | 56.2 |

Samples (100 mg.) of the four cellulose derivatives prepared above were placed in stoppered test tubes together with aliquots (5 ml.) of hydrochloric acid (1 N). The tubes were placed in an ice bath and magnetically stirred for 15 minutes when aliquots (4 ml.) of ice-cold sodium nitrite solution were added. After a further 15 minutes the tubes were centrifuged, the supernatant discarded, aliquots (15 ml.) of ice-cold phosphate buffer (0.075 M, pH 7.6–7.7) added and the tubes

EXAMPLE II

Samples (100 mg.) of the four cellulose derivatives prepared in example 1 were placed in stoppered test tubes together with aliquots (5 ml.) of hydrochloric acid (1 N). The tubes were placed in an ice bath and magnetically stirred for 15 minutes when aliquots (4 ml.) of ice-cold sodium nitrite solution were added. After a further 15 minutes the tubes were centrifuged, the supernatant discarded, aliquots (15 ml.) of ice-cold phosphate buffer (0.02 M, pH 6.3–6.4) added and the tubes magnetically stirred for 15 minutes. The washing cycle was repeated three times. After the final washings had been decanted, aliquots (1 ml.) of a 0.5 percent α-amylase solution (crystalline, ex *Bacillus subtilis*, purchased from Sigma Chemical Company) in phosphate buffer (0.02 M, pH 6.3–6.4) were added and the tubes stirred magnetically at 0°–5° C. for 18 hours, when aliquots (5 ml.) of an ice-cold solution of β-naphthol (0.01 percent) in saturated sodium acetate were added. After a further 15 minutes the water-insoluble α-amylase derivatives were subjected to five cycles of washing with phosphate buffer (0.02 M, pH 6.9, 15 ml.) and sodium chloride (0.5 M) solution (15 ml.) in the same buffer. The α-amylase derivatives were finally washed twice with phosphate buffer (0.02 M, pH 6.9).

RESULTS

| Functional group active in protein binding | μ eq. active functional group/g. cellulose | Mg. bound protein/ 100 mg. derivative | Enzyme units [1]/mg. bound protein | Percent activity retained by enzyme after coupling | Prep No. |
|---|---|---|---|---|---|
| p-Diazophenoxyhydroxy-propyl, pH 6.3–6.4 | 13.0 | 0.79 | 45.7 | 51 | 5 |
| | 20.7 | 0.83 | 31.5 | 35 | 6 |
| | 31.3 | 1.47 | 15.9 | 18 | 7 |
| | 56.2 | 1.50 | 14.5 | 16 | 8 |

[1] One α-amylase unit is that which liberates reducing sugar equivalent to 1 mg. maltose in 3 minutes at 20° C.

EXAMPLE III

Samples (100 mg.) of the four p-amino-phenoxy-hydroxypropyl cellulose ethers prepared in example 1 were magnetically stirred into a slurry with aliquots (0.5 ml.) of phosphate buffer (3.5 M, pH 6.8). Aliquots (0.2 ml.) of 10 percent thiophosgene solution in carbon tetrachloride were added and stirring continued for 20 minutes, when further aliquots (0.2 ml.) of thiophosgene solution were added. After a further 20 minutes the p-isothiocyanato-phenoxy-hydroxypropyl cellulose ethers were washed once with acetone (15 ml.), twice with sodium bicarbonate solution (0.5 M, 15 ml.) and twice with borate buffer (0.05 M, pH 8.5, 15 ml.). After decantation of the final washings aliquots (1 ml.) of a 0.5 percent α-amylase solution (crystalline, ex *Bacillus subtilis*, Sigma Chemical Company) in borate buffer (0.05 M, pH 8.5) were added and the tubes stirred magnetically at 0°–5° C. for 18 hours. The α-amylase derivatives were subjected to five cycles of washing with phosphate buffer (0.02 M, pH 6.9, 15 ml.) and sodium chloride (0.5 M, 15 ml.) in the same buffer. The α-amylase derivatives were finally washed twice with phosphate buffer (0.02 M, pH 6.9).

RESULTS

| Functional group active in protein binding | μ eq. active functional group/g. cellulose | Mg. bound protein/ 100 mg. derivative | Enzyme units [1]/mg. bound protein | Percent activity retained by enzyme after coupling | Prep. No. |
|---|---|---|---|---|---|
| p-Isothiocyanatophenoxy-hydroxypropyl, pH 8.5 | 13.0 | 1.36 | 47.4 | 53 | 9 |
| | 20.7 | 1.42 | 36.6 | 42 | 10 |
| | 31.3 | 1.49 | 21.1 | 23 | 11 |
| | 56.2 | 1.50 | 22.4 | 25 | 12 |

[1] One α-amylase unit is that which liberates reducing sugar equivalent to 1 mg. maltose in 3 minutes at 20° C.

EXAMPLE IV p-Amino-phenoxy-hydroxypropyl cellulose hydrochloride (100 mg., 20.6 μeq. ether linkage/g.), prepared as in example I, was placed in a stoppered test tube and magnetically stirred into a slurry with phosphate buffer (3.5 M, pH 6.8, 0.5 ml.). Thiophosgene solution (10 percent, 0.2 ml.) in carbon tetrachloride was added and stirring continued for 20 minutes when a further aliquot (0.2 ml.) of thiophosgene solution was added. After stirring for a further 20 minutes acetone (15 ml.) was added and the solid p-isothiocyanato-phenoxy-hydroxypropyl cellulose recovered by centrifugation. The washing cycle was repeated twice with sodium bicarbonate solution (0.5 M, 15 ml.) and twice with borate buffer (0.05 M, pH 8.6, 15 ml.). After decantation of the final washings a solution of β-amylase (crystalline, ex sweet potato, Sigma Chemical Company; 5 mg.) in borate buffer (0.05 M, pH 8.6, 1 ml.) was added and coupling allowed to proceed with gentle magnetic stirring for 48 hours at 0°–5° C. The water-insoluble β-amylase derivative was subjected to five cycles of alternate washing with acetate buffer (0.02 M, pH 4.8, 15 ml.) and a solution of sodium chloride (1.0 M, 15 ml.) in the same buffer. After two further washings with acetate buffer (15 ml.) and final decantation of the washings the β-amylase derivative was resuspended in the same buffer (10 ml.).

EXAMPLE V p-Isothiocyanato-phenoxy-hydroxypropyl cellulose, prepared as above, was twice washed with sodium bicarbonate solution (0.5 M, 15 ml.) and twice with borate buffer (0.05 M, pH 8.6, 15 ml.). After decantation of the final washings a solution of γ-amylase (glucamylase, ex *Aspergillus Niger*, partially purified by the starch procedure described by Cameron in Proc. Ciba Foundation Symposium J. and A. Churchill Press, London 1967, 177; 5 mg. protein) in borate buffer (0.05 M, pH 8.6, 1 ml.) was added and coupling allowed to proceed with magnetic stirring for 48 hours at 0°–5° C. The water-insoluble γ-amylase derivative was subjected to five cycles of alternate washing with acetate buffer (0.02 M, pH 4.5, 15 ml.) and a solution of sodium chloride (1.0 M, 15 ml.) in the same buffer. After two further washings with acetate buffer (0.02 M, pH 4.5, 15 ml.) and final decantation of the washings the γ-amylase derivative was resuspended in the same buffer (10 ml.).

RESULTS

| Prep. No. | Enzyme units [1]/mg. free protein | Mg. bound protein/ 100 mg. derivative | Enzyme units [1]/mg. bound protein | Percent activity retained by enzyme after coupling |
|---|---|---|---|---|
| 13 (Ex. IV) | 499.9 | 1.75 | 126.0 | 25.1 |
| 14 (Ex. V) | 28.2 | 0.96 | Inactive | Inactive |

[1] One amylase unit is taken as that which liberated reducing sugar equivalent to 1 mg. maltose at 20° C. (β-amylase) or 1 mg. glucose at 45° C. (γ-amylase) in 3 minutes.

EXAMPLE VI p-Amino-phenoxy-hydroxypropyl cellulose hydrochloride (100 mg. 20.7 μeq. ether linkage/g.) prepared as described in example I, was stirred magnetically at 0° C. with hydrochloric acid (1N, 5 ml.). Sodium nitrite solution (2 percent, 4 ml.) precooled to 0° C., was added and stirring continued for 15 minutes. The p-diazo-phenoxy-hydroxypropyl cellulose was washed four times with phosphate buffer (0.075 M, pH 7.6–7.7, 15 ml.) at 0° C. After decantation of the final washings a solution of β-amylase (crystalline, ex sweet potato, purchased from Sigma Chemical Company, 5 mg.) in phosphate buffer (0.075 M, pH 7.6–7.7, 1 ml.) was added and coupling allowed to proceed with gentle magnetic stirring for 48 hours at 0°–5° C. A solution of phenol (0.01 percent, 5 ml.) in saturated aqueous sodium acetate at 0° C. was then added. After a further 15 minutes stirring the water-insoluble β-amylase derivative was recovered by centrifugation.

After discarding the supernatant, the derivative was subjected to the washing procedure as described for the β-amylase derivative prepared by isothiocyanato coupling (example IV) and suspended in acetate buffer (0.02 M, pH 4.8, 10 ml.).

EXAMPLE VII p-Diazo-phenoxy-hydroxypropyl cellulose, prepared as above, was washed four times with phosphate buffer (0.075 M, pH 7.6–7.7, 15 ml.) at 0° C. After decantation of the final washings a solution of γ-amylase (ex *Aspergillus Niger*, partially purified, 5 mg. protein) in phosphate buffer (0.075 M, pH 7.6–7.7, 1 ml.) was added and coupling allowed to proceed with gentle magnetic stirring for 48 hours at 0°–5° C. A solution of phenol (0.01 percent, 5 ml.) in saturated sodium acetate at 0° C. was then added. After a further 15 minutes stirring the water insoluble γ-amylase derivative was recovered by centrifugation. After discarding the supernatant, the derivative was subjected to the washing procedure described for the γ-amylase derivative prepared by isothiocyanato coupling (example V) and suspended in acetate buffer (0.02 M, pH 4.5, 10 ml.).

RESULTS

| Prep. No. | Enzyme | Enzyme units [1]/mg. free protein | Mg. bound protein/ 100 mg. derivative | Enzyme units [1]/mg. bound protein | Percent activity retained by enzyme after coupling |
|---|---|---|---|---|---|
| 15 | (Ex. VI) | 499.9 | 4.24 | 83.3 | 16.6 |
| 16 | (Ex. VII) | 28.2 | 1.25 | 5.01 | 17.7 |

[1] One amylase unit was taken as that which liberated reducing sugar equivalent to 1 mg. maltose at 20° C. (β-amylase) or 1 mg. glucose at 45° C. (γ-amylase) in 3 minutes.

EXAMPLE VIII

A sample of water-insoluble α-amylase (preparation 2, 20 mg.) was suspended in phosphate buffer (0.02 M, pH 6.9, 2 ml.) and incubated at 45° C. Aliquots (0.2 ml.) were withdrawn at times 0, 0.125, 1, 2, 4 and 7 days and pipetted directly into a magnetically stirred starch solution (10 ml. 1 percent) in phosphate buffer (0.02 M, pH 6.9) at 45° C. The activity of the water-insoluble α-amylase sample was then determined by periodic sampling and assay of the digests with dinitrosalicylate reagent according to Bernfeld [Methods in Enzymology (1955) 149]. Hence the percentage of the original activity remaining in the water-insoluble α-amylase preparation was determined.

A control incubation was performed in which the water-insoluble α-amylase was replaced by a solution of an equivalent amount of free α-amylase in phosphate buffer (0.02 M, pH 6.9, 2 ml.).

A sample of the diazo-coupled water-insoluble β-amylase suspension (preparation 15) was maintained at 40° C. over 7 days and its activity determined at intervals against magnetically stirred starch solution as described above. A control incubation was performed in which the water-insoluble β-amylase suspension was replaced by a solution of free β-amylase in acetate buffer (0.02 M, pH 4.8). The percentage of the original activities remaining after various time intervals was then calculated. The experiment was repeated at 50° C. over an incubation period of 4 days.

The stability of γ-amylase derivative (preparation 16) was determined by means of similar experiments performed over an incubation period of 4 days at 50° C. and 60° C. and over an incubation period of 2 days at 70° C.

RESULTS

| Enzyme | Mode of coupling | Temperature °C. | Percent retention of activity | | | | |
|---|---|---|---|---|---|---|---|
| | | | 3 hours | 1 day | 2 days | 4 days | 7 days |
| β-amylase | None | 40 | 88 | 59 | 48 | 31 | 12 |
| | Diazo | 40 | 91 | 81 | 73 | 57 | 41 |
| | None | 50 | 40 | 20 | | | |
| | Diazo | 50 | 74 | 44 | 25 | | |
| | None | 50 | 85 | 63 | 46 | 36 | |
| | Diazo | 50 | 89 | 68 | 55 | 44 | |
| γ-amylase | None | 60 | 45 | 29 | 19 | 5 | |
| | Diazo | 60 | 60 | 33 | 24 | 17 | |
| | None | 70 | 7 | | | | |
| | Diazo | 70 | 22 | 15 | 11 | | |
| α-amylase | None | 45 | 18 | 0 | | | |
| | Diazo | 45 | 87 | 66 | 47 | 33 | 21 |

EXAMPLE IX

Suspensions (10 mg./ml.) of water-insoluble α-amylase (preparations Nos. 1, 2, 3 and 4) in phosphate buffer (0.02 M, pH 6.9) were stored for 4 months at 0°–5° C. The activity of the preparations was then determined, and the percentage of the original activity remaining calculated.

Retention of activity on storage of water-insoluble α-amylase derivatives

| Enzyme | Prep. No. | Mode of coupling | % of original activity remaining after 4 months |
|---|---|---|---|
| α-amylase | 1 | Diazo- | 66 |
| | 2 | | 62 |
| | 3 | | 73 |
| | 4 | | 71 |

Suspensions of water insoluble β-amylase (preparations 13 and 15) in acetate buffer (0.02 M, pH 4.8) and γ-amylase (preparation 16) in acetate buffer (0.02 M, pH 4.5) were stored for 3 months at 0°–5° C. The activity of the preparations was then determined and the percentage of the original activity calculated.

Retention of activity on storage of water-insoluble β- and γ-amylase derivatives

| Enzyme | Prep. No. | mode of coupling | % of activity storage for 3 months at for 0°–5° C. |
|---|---|---|---|
| β-amylase | 13 | Isothiocyanato- | 89 |
| β-amylase | 15 | Diazo- | 100 |
| γ-amylase | 16 | Diazo- | 100 |

EXAMPLE X

Preparation of 1,2-Epoxy-3-(p-nitrophenoxy) propane (glycidyl p-nitrophenyl ether)

p-Nitrophenol (695 g. 5 mole) was suspended in a solution of sodium hydroxide (250 g. 6 mole) in water (4 liters) and the mixture heated to 70° C. to effect solution. On cooling slowly to room temperature with vigorous stirring finely divided sodium p-nitrophenoxide separated. Epichlorohydrin (460 g. 5 mole) was added and the solution agitated in a 5-liter stainless steel vessel at room temperature after which the solid was collected and washed in a rolling ball-mill (160 r.p.m.) with distilled water until free of bright yellow sodium p-nitrophenoxide. The off-white damp solid was dissolved directly in ethanol (400 ml.), and concentrated, a very pale yellow solid crystallizing (350 g.).

Preparation of 2-hydroxy-3-(p-nitrophenoxy) propyl ethers and 3-(p-amino-phenoxy)-2-hydroxypropyl ether hydrochlorides of cellulose A sample of microcrystalline cellulose [(150 g.) Sigmacell type 38 purchased from Sigma Chemical Co., England] was placed in a 1 liter stoppered round-bottomed flask, evacuated and filled with nitrogen. After warming each flask to 50° C., 300 ml. of prewarmed solution of p-nitro-phenyl-glycidyl ether (as prepared above, 10 percent in toluene was added followed by 150 ml. of aqueous sodium hydroxide (10 percent). The contents of the flask were well mixed and stoppered. All operations were performed under nitrogen. The flasks were maintained at 50° C. After 48 hours the reaction mixture was transferred to a ball-mill and ground for 10 minutes at 160 r.p.m. with acetic acid (2 N) before being suspended and stirred with the same solvent (1 liter). The p-nitro-phenoxy-hydroxypropyl cellulose ether (2-hydroxy-3-(p-nitrophenoxy) propyl ether) was collected, washed with acetone, and then stirred with acetone for 0.5 hour. After three washings with distilled water and one further with acetone, the pale yellow ethers were collected and dried.

Reduction of the p-nitro-phenoxy-hydroxypropyl cellulose was effected by suspending 120 g. in a 1:1 solution of titanous chloride (12.5 percent) in hydrochloric acid (6N, 2.400 ml.) at 100° C. for 10 minutes. The p-amino-phenoxy-hydroxypropyl cellulose hydrochlorides (3-(p-aminophenoxy)-2-hydroxypropyl ether hydrochloride of cellulose) were collected on a filter and washed with hydrochloric acid (2N) until free of excess titanous chloride. The sample was washed three times with distilled water and finally with acetone before being collected on a filter and dried.

Preparation of water-insoluble γ-amylase derivatives by coupling γ-amylase with diazotized 3-(p-amino-phenoxy)-2-hydroxypropyl ethers of cellulose Samples (25 g.) of the cellulose derivative prepared above were placed in beakers together with aliquots (1.25 liters) of hydrochloric acid (2 N). The beakers were placed in an ice bath and stirred for 15 minutes, when aliquots (1 liter) of ice-cold sodium nitrite solution (2 percent) were added. After a further 15 minutes the contents were centrifuged, the supernatant discarded, aliquots (1 liter) of ice-cold phosphate buffer (0.075 M, pH 7.6–7.7) added and the contents stirred for 15 minutes. The washing cycle was repeated three times. After the final washing aliquots (200 ml.) of solutions of commercial γ-amylase preparations were added.

Group A—Dialysed enzyme, activity 35.5 units/mg. protein (Agidex, Glaxo).
Group B—As above but activity 66.1 units/mg. protein.
Group C—Nondialysed commercial enzyme (Novo), activity 44.2 units/mg. protein In each group solutions of varying protein concentrations were made up in acetate buffer (0.075 M, pH 4.5) to give applied protein concentrations in the range 420–4000 mg. protein/200 ml. The suspensions were stirred magnetically at 0°–5° C. for 48 hours when aliquots (1.25 liters) of an ice-cold solution of β-naphthol (0.01 percent) in sodium acetate (10 percent) were added. After a further 15 minutes, the water insoluble γ-amylase derivatives were subjected to five cycles of washing with acetate buffer (0.02 M, pH 4.5) (1 liter) and sodium chloride solution (1 M, 1 liter) in the same buffer. The γ-amylase derivatives were finally washed twice with acetate buffer (0.02 M, pH 4.5).

RESULTS

| Prepn. No. | Applied protein concentration mg. | Bound protein mg./g. deriviative | Enzyme units/mg. bound protein | Activity retained % |
|---|---|---|---|---|
| Group A | | | | |
| 17 | 2,550 | 12.6 | 8.8 | 23 |
| 18 | 3,248 | 33.5 | 10.3 | 28.4 |
| 19 | 4,080 | 14.1 | 6.7 | 17.4 |
| Group B | | | | |
| 20 | 420 | 36.9 | 6.5 | 11.7 |
| 21 | 647 | 31.6 | 8.5 | 15.3 |
| 22 | 1,016 | 36.9 | 10.5 | 19 |
| Group C | | | | |
| 23 | 905 | 32 | 5.4 | 12.2 |
| 24 | 2,170 | 34.5 | 7.2 | 16.3 |
| 25 | 3,620 | 16.6 | 9.8 | 22.2 |

One γ-amylase unit liberates reducing sugars equivalent to μ mole of glucose in 1 minute at 45° C.

EXAMPLE XI p-Diazo-phenoxy-hydroxypropyl cellulose (100 mg.) prepared as in example 1 was washed four times with phosphate buffer (0.075 M, pH 4.5, 15 ml.) at 0° C. After decantation of the final washings a solution of γ-amylase (ex. *Aspergillus Niger*, commercial preparation, 0.04 ml.) in acetate buffer (0.075 M, pH 4.5, 1 ml.) was added and coupling allowed to proceed with gentle stirring for periods from 12 to 72 hours. The addition of β-naphthol and washings were then carried as described in example X.

RESULTS

| Prepn. No. | Time of coupling hours | Activity Enzyme units/mg. bound protein | Bound protein concentration mg./g. solid |
|---|---|---|---|
| 26 | 12 | 2.05 | 34.8 |
| 27 | 24 | 2.50 | 36.0 |
| 28 | 48 | 2.50 | 38.7 |
| 29 | 72 | 1.80 | 31.3 |

EXAMPLE XII p-Diazo-phenyoxy-hydroxypropyl cellulose (100 mg.) prepared as in example X was washed four times with phosphate buffer (0.075 M, pH 4.5, 15 ml.) at 0° C. After decantation of the final washings a solution of γ-amylase (ex. *A. Niger*, crude commercial preparation, 0.04 ml.) in (a) phosphate buffer (0.075 M, pH 7.6, 1 ml.), (b) acetate buffer (0.075 M, pH 4.5, 1 ml.) was added and coupling allowed to proceed with gentle stirring. The addition of β-naphthol and washings were then carried out as described in example X.

RESULTS

| Prepn. No. | Buffer solution | Activity Enzyme units/mg. bound protein | Bound protein mg./g. solid |
|---|---|---|---|
| 30 | Phosphate pH 7.6 | 2.3 | 29.8 |
| 31 | Acetate pH 4.5 | 3.2 | 22.9 |

EXAMPLE XIII

As example XI, using a 48 hour coupling except for the reduction stage:

Reduction of the p-nitro-phenoxy-hydroxypropyl cellulose was effected by suspending 1 g. in citrate buffer (pH 5,8, 0.65 M, 30 ml.) with 25 ml. of titanous chloride solution (12.5 percent) and stirring at room temperature for 48 hours.

RESULTS

| Prepn. No. | Method of Reduction | Activity Enzyme units/mg. bound protein | Protein mg./g. solid |
|---|---|---|---|
| 32 | Example XI (HCl) | 2.5 | 37.5 |
| 33 | Example XIII (Citrate) | 1.4 | 37.8 |

EXAMPLE XIV

Samples of water insoluble γ-amylase (total activity 100 units, 25 mg. protein/g. derivative) suspended in acetate buffer (0.02 M, pH 4.5, 10 ml.) were added to a stirred temperature controlled vessel (60° C.) containing maltose solutions in acetate buffer (0.005 M, to 0.5 M, 250 ml.) and the initial velocity of the reaction producing glucose measured by following the glucose concentrations using the method of Dalqvist, *Biochem. J.*, 80, (1961) 547 to determine the glucose.

RESULTS

| Run No. | Initial maltose concn. | Initial reaction velocity mg. glucose/ml./hour |
|---|---|---|
| a | 0.005 | 1.9 |
| b | 0.01 | 2.7 |
| c | 0.01 | 3.2 |
| d | 0.02 | 3.3 |
| e | 0.05 | 4.4 |
| f | 0.1 | 5.7 |
| g | 0.1 | 5.1 |
| h | 0.2 | 6.0 |
| i | 0.5 | 6.7 |

EXAMPLE XV

Suspensions of water insoluble γ-amylase (preparation 22, 10.5 units/mg. bound protein, 36.9 mg. protein/g. of derivative) in acetate buffer (0.02 M, pH 4.5) were applied in various concentrations to suspensions of wheat-starch (20 percent w./v.) in acetate buffer (300 ml.) in a jacketed (60° C.) stirred vessel. The production of reducing sugars was followed by the method of ferricyanide reduction (Hagedorn-Jenson) and the results obtained from the slope of the curve at zero time.

RESULTS

| Run No. | Applied enzyme concentration Bound protein mg. | Activity units | Initial reaction rate mg. reducing sugar/ml./hour. |
|---|---|---|---|
| j | 8 | 84 | 8 |
| k | 16 | 168 | 9 |
| l | 31 | 338 | 17 |
| m | 47 | 494 | 22 |
| n | 63 | 662 | 39 |
| o | 79 | 830 | 42 |

EXAMPLE XVI

Suspensions containing 1.5 g. insoluble γ-amylase (preparation 17, 8.8 units/mg. protein, 12.6 mg. protein/g. of derivative) in acetate buffer (0.02 M, pH 4.5, 20 ml.) were applied to suspensions of wheat-starch (10, 20, 30 percent) in acetate buffer (280 ml.) in a jacketed (60° C.) stirred vessel.

RESULTS

| Run No. | Applied enzyme activity | Starch concn. w./v.% | Initial reaction rate mg. reducing sugar/ml./hour |
|---|---|---|---|
| p | 155 | 10 | 3 |
| q | 155 | 20 | 20 |
| r | 155 | 30 | 35 |

EXAMPLE XVII

Suspensions containing 0.43 g. insoluble γ-amylase (preparation 22) in acetate buffer (0.02 M, pH 4.5, 20 ml.) were applied to suspensions of wheat-starch which had been previously acid hydrolized to a dextrose equivalent (D.E.) of 12 percent, neutralized and dissolved in acetate buffer (0.02 M, pH 4.5, 280 ml.) at 60° C.

RESULTS

| Run No. | Initial starch concn. (pre-hydrolysis) w./v.% | Initial reaction rate mg. reducing sugar/ml./hour | Time to D.E. 96%, hours |
|---|---|---|---|
| s | 10 | 40 | 6 |
| t | 20 | 50 | 24 |
| u | 30 | 52 | 18 |

EXAMPLE XVIII

Suspensions of enzyme preparations of α- and β-amylase (Nos. 3, 15, 11 and 13) were centrifuged down and the supernatant discarded. An aliquot (5ml.) of starch solution (1 percent) in the appropriate buffer was added, the digest magnetically stirred briefly and centrifuged down. A sample (1 ml.) was then pipetted into dinitrosalicylate reagent (1 ml.) as a zero time blank. The digest was magnetically stirred for 15 minutes, centrifuged down and part of the supernatant (1 ml.) pipetted into dinitrosalicylate reagent (1 ml.). Each remaining supernatant was discarded and each preparation stirred briefly with 5 ml. of the same buffer that was used before except that no starch was present. After centrifuging down and discarding the supernatant the experiment was repeated eight times in all. The supernatant from the final digest was further incubated at 20° C. —no further digestion was apparent except in the case of preparation 13.

RESULTS

| Prep. No. | Enzyme | Mode of coupling | | | | Buffer | | | |
|---|---|---|---|---|---|---|---|---|---|
| | | Diazo coupled | | | | 0.02 M phosphate, pH 6.9 | | | |
| 3 | α-Amylase: ΔO.D. 520 nm | 1.90 | 1.04 | 0.92 | 0.87 | 0.77 | 0.71 | 0.70 | 0.68 |
| | Times used | 1 | 2 | 3 | 4 | 5 | 6 | 7 | 8 |
| | Percent activity remaining | | 55 | 48.5 | 46 | 40.5 | 37 | 37 | 36 |
| | | Diazo coupled | | | | 0.02 M acetate, pH 4.8 | | | |
| 15 | β-Amylase: ΔO.D. 520 nm | 0.98 | 0.53 | 0.44 | 0.37 | 0.32 | 0.27 | 0.24 | 0.22 |
| | Times used | 1 | 2 | 3 | 4 | 5 | 6 | 7 | 8 |
| | Percent activity remaining | | 54 | 45 | 38 | 32.5 | 27.5 | 24.5 | 22.5 |
| | | Isothiocyanato | | | | 0.02 M phosphate, pH 6.9 | | | |
| 11 | α-Amylase: ΔO.D. 520 nm | 1.65 | 1.22 | 1.12 | 1.01 | 0.93 | 0.86 | 1.81 | 0.76 |
| | Times used | 1 | 2 | 3 | 4 | 5 | 6 | 7 | 8 |
| | Percent activity remaining | | 73 | 67 | 61 | 56 | 52 | 49 | 46 |
| | | Isothiocyanato | | | | 0.02 M acetate, pH 4.8 | | | |
| 13 | β-Amylase: ΔO.D. 520 nm | 1.49 | 0.78 | 0.62 | 0.54 | 0.50 | 0.45 | 0.40 | 0.36 |
| | Times used | 1 | 2 | 3 | 4 | 5 | 6 | 7 | 8 |
| | Percent activity remaining | | 52 | 42 | 36 | 33.5 | 30 | 27 | 24 |

What we claim is:

1. A process for the preparation of an active water-insoluble amylase which process comprises reacting at 0°–5° C. α, β or γ-amylase dissolved in a buffer within a pH range of 6.3 –7.7 with the p-diazophenoxy hydroxypropyl ether of microcrystalline cellulose.

2. A process as claimed in claim 1 wherein the pH range is between 7.6 and 7.7.

3. A process as claimed in claim 2 wherein unreacted diazo groups in the cellulose derivative are annealed by reaction with β-naphthol or phenol.

4. A process as claimed in claim 2 wherein the degree of substitution of ether groups in the cellulose is between 13.–56.2 microequivalents of p-diazophenoxy hydroxypropyl ether groups per gram of cellulose.

5. A process for the preparation of an active water insoluble amylase which process comprises reacting at 0°–5° C., α or β-amylase dissolved in a buffer at a pH of approximately 8.6 with the P-isothiocyanato-phenoxy-hydroxypropyl ether of microcrystalline cellulose.

6. A process as claimed in claim 5 wherein the buffer is 0.05 M borate buffer, pH 8.6.

7. A process as claimed in claim 5 wherein the degree of substitution of ether groups in the cellulose is 13–56.2 microequivalents of p-isothiocyanato-phenoxy-hydroxypropyl ether groups per gram of cellulose.

8. A process as claimed in claim 1 wherein the p-diazophenoxy-hydroxypropyl ether of cellulose is prepared from 3-(p-aminophenoxy)-2-hydroxypropyl ether hydrochloride of cellulose by treatment with acidified sodium nitrite solution just prior to use for this purpose.

9. A process as claimed in claim 8 wherein the 3-(p-aminophenoxy)-2-hydroxypropyl ether hydrochloride of cellulose is prepared by reducing 2-hydroxy-3-(p-nitrophenoxy) propyl ether of cellulose using titanous chloride in the presence of acid.

10. A process as claimed in claim 9 wherein a citrate buffer is employed in place of the acid.

11. A process as claimed in claim 9 wherein the 2-hydroxy-3-(p-nitrophenoxy) propyl ether of cellulose is prepared by reaction of cellulose with glycidyl p-nitrophenyl ether under nitrogen in the presence of alkali.

12. A process as claimed in claim 9 wherein the 3-(p-aminophenoxy)-2-hydroxypropyl ether of cellulose is converted to 2-hydroxy-3-(p-isothiocyanatophenoxy) propyl ether of cellulose by treatment with thiophosgene in carbon tetrachloride.

13. α-Amylase chemically coupled to p-diazophenoxy hydroxypropyl cellulose.

14. β-Amylase chemically coupled to p-diazophenoxy hydroxypropyl cellulose.

15. γ-Amylase chemically coupled to p-diazophenoxy hydroxypropyl cellulose.

16. α-Amylase chemically coupled to p-isothiocyanato phenoxy hydroxypropyl cellulose.

17. β-Amylase chemically coupled to p-isothiocyanato phenoxy hydroxypropyl cellulose.

18. A water insoluble amylase comprising α- β- or γ-amylase chemically coupled to p-diazophenoxy hydroxypropyl cellulose or α- or β-amylase chemically coupled to p-isothiocyanatophenoxy hydroxypropyl cellulose.

* * * * *